US006850540B1

(12) United States Patent
Peisa et al.

(10) Patent No.: US 6,850,540 B1
(45) Date of Patent: Feb. 1, 2005

(54) PACKET SCHEDULING IN A COMMUNICATIONS SYSTEM

(75) Inventors: Janne Johannes Peisa, Helsinki (FI); Toomas Wigell, Espoo (FI); Reijo Matinmikko, Espoo (FI); Carl Göran Schultz, Pargas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 677 days.

(21) Appl. No.: 09/698,785

(22) Filed: Oct. 27, 2000

Related U.S. Application Data

(60) Provisional application No. 60/185,005, filed on Feb. 25, 2000, provisional application No. 60/185,003, filed on Feb. 25, 2000, and provisional application No. 60/184,975, filed on Feb. 25, 2000.

(30) Foreign Application Priority Data

Nov. 28, 1999 (GB) .............................................. 9925376

(51) Int. Cl.[7] .............................. H04J 3/16; H04J 3/22
(52) U.S. Cl. .................................... 370/468; 370/395.4
(58) Field of Search ................................ 370/468, 230, 370/235, 412, 395.4–395.43

(56) References Cited

U.S. PATENT DOCUMENTS

| | | | | |
|---|---|---|---|---|
| 5,914,950 | A | | 6/1999 | Tiedemann, Jr. et al. ... 370/348 |
| 6,108,552 | A | * | 8/2000 | Edwards et al. .......... 455/452.1 |
| 6,295,295 | B1 | * | 9/2001 | Wicklund .................... 370/392 |
| 6,317,416 | B1 | * | 11/2001 | Giroux et al. .............. 370/232 |
| 6,320,845 | B1 | * | 11/2001 | Davie .......................... 370/230 |
| 6,374,112 | B1 | * | 4/2002 | Widegren et al. ......... 455/452.2 |
| 6,438,134 | B1 | * | 8/2002 | Chow et al. ................. 370/412 |
| 6,438,138 | B1 | * | 8/2002 | Kamiya ....................... 370/468 |
| 6,452,933 | B1 | * | 9/2002 | Duffield et al. ............. 370/415 |
| 6,647,419 | B1 | * | 11/2003 | Mogul ......................... 709/226 |

FOREIGN PATENT DOCUMENTS

| | | |
|---|---|---|
| EP | 0859492 A2 | 2/1998 |
| EP | 1030484 A2 | 1/2000 |

OTHER PUBLICATIONS

Abhay K. Parekh; *A Generalized Processor Sharing Approach to Flow Control in Integrated Services Networks: The Single–Node Case*; IEEE; Jun. 1993; vol. 1, No. 3; pp. 344–357.
PCT International Search Report dated Jul. 12, 2001.

* cited by examiner

*Primary Examiner*—Ajit Patel
*Assistant Examiner*—Chirag Shah

(57) ABSTRACT

Methods, systems, and arrangements enable packet scheduling in accordance with quality of service (QoS) constraints for data flows. In a Universal Mobile Telecommunications System (UMTS) network environment, for example, a Medium Access Control (MAC) layer schedules packet transmission of various data flows to meet stipulated criteria, including permitted transport format combinations (TFCs) from a TFC set (TFCS). In first embodiment(s), the TFC is selected based on guaranteed rate transmission rates, weighted fair queuing (WFQ) transmission rates, QoS class, transport block set size (TBSS), and optionally queue fill levels. These first embodiment(s) also further refine the selection process using backlog memories corresponding to previously unmet guaranteed and/or fair transmission rates. In second embodiment(s), memory requirements are reduced by selecting a TFC based on guaranteed rate transmission rates, QoS class, TBSS, and queue fill levels, without accommodating backlogs.

39 Claims, 6 Drawing Sheets

PACKET SCHEDULING IN A COMMUNICATIONS SYSTEM

CROSS-REFERENCES TO RELATED APPLICATIONS

This Non-provisional Application for Patent claims the benefit of priority from, and hereby incorporates by reference the entire disclosure of, co-pending U.S. Provisional Application for Patent Ser. No. 60/185,005, filed Feb. 25, 2000. U.S. Provisional Applications for Patent Ser. Nos. 60/184,975 and 60/185,003, both filed on Feb. 25, 2000, are also hereby incorporated by reference in their entirety herein. This Non-provisional Application for Patent also claims the benefit of priority from Great Britain Patent Application No. GB9925376.7, filed in the United Kingdom on Oct. 28, 1999, with an inventorship of Janne Peisa.

This Non-provisional Application for Patent is related by subject matter to U.S. Non-provisional applications for patent Ser. Nos. 09/698,786 and 09/698,672, both of which are filed on even date herewith. These two U.S. Non-provisional applications for patent are also hereby incorporated by reference in their entirety herein.

BACKGROUND OF THE INVENTION

1. Technical Field of the Invention

The present invention relates in general to the field of communications systems, and in particular, by way of example but not limitation, to scheduling packets of data/informational flows having differing priority levels in a communications system.

2. Description of Related Art

Access to and use of wireless networks is becoming increasingly important and popular for business, social, and recreational purposes. Users of wireless networks now rely on them for both voice and data communications. Furthermore, an ever increasing number of users demand both an increasing array of services and capabilities as well as greater bandwidth for activities such as Internet surfing. To address and meet the demands for new services and greater bandwidth, the wireless communications industry constantly strives to improve the number of services and the throughput of their wireless networks. Expanding and improving the infrastructure necessary to provide additional services and higher bandwidth is an expensive and manpower-intensive undertaking. Moreover, high-bandwidth data streams will eventually be demanded by consumers to support features such as real-time audio-visual downloads and live audio-visual communication between two or more people. In the future, it will therefore become necessary and/or more cost-effective to introduce next generation wireless system(s) instead of attempting to upgrade existing system(s).

To that end, the wireless communications industry intends to continue to improve the capabilities of the technology upon which it relies and that it makes available to its customers by deploying next generation system(s). Protocols for a next-generation standard that is designed to meet the developing needs of wireless customers is being standardized by the $3^{rd}$ Generation Partnership Project (3GPP). The set of protocols is known collectively as the Universal Mobile Telecommunications System (UMTS).

Referring now to FIG. 1, an exemplary wireless communications system with which the present invention may be advantageously employed is illustrated generally at 100. In a UMTS network 100, the network 100 includes a core network 120 and a UMTS Terrestrial Radio Access Network (UTRAN) 130. The UTRAN 130 is composed of, at least partially, a number of Radio Network Controllers (RNCs) 140, each of which may be coupled to one or more neighboring Node Bs 150. Each Node B 150 is responsible for a given geographical cell. and the controlling RNC 140 is responsible for routing user and signaling data between that Node B 150 and the core network 120. All of the RNCs 140 may be directly or indirectly coupled to one another. A general outline of the UTRAN 130 is given in Technical Specification TS 25.401 V2.0.0 (1999-09) of the $3^{rd}$ Generation Partnership Project, 3GPP, which is hereby incorporated by reference in its entirety herein. The UMTS network.100 also includes multiple user equipments (UEs) 110. UE may include, for example, mobile stations, mobile terminals, laptops/personal digital assistants (PDAs) with wireless links, etc.

In conventional wireless systems, data transmissions and/or access requests compete for bandwidth based on first come, first served and/or random paradigms. Each mobile station, and its associated transmissions, typically acquire access to a network using some type of request (e.g., a message) prior to establishing a connection. Once the mobile station has established a connection, the mobile station receives a predetermined transmission bandwidth that is usually mandated by the air interface requirements of the relevant system. In a UMTS network, on the other hand, transmission bandwidth is variable, more flexible, and somewhat separated from the physical channel maximum mandated by-the air interface requirements of UMTS. However, certain guaranteed bandwidth and/or quality of service (Qos) requirements must be provided to the UEs. There is therefore a need to ensure that the guaranteed bandwidth and/or QoS is provided to each respective UE in the variable and flexible environment of UMTS.

SUMMARY OF THE INVENTION

The above-identified deficiencies, as well as others, that are associated with existing schemes are remedied by the methods, systems, and arrangements of the present invention. For example, as heretofore unrecognized, it would be beneficial to be able to handle specified guaranteed bandwidth and QoS requirements when multiplexing more than one incoming data flow onto a single output channel. In fact, it would be beneficial if a two-level scheduling mechanism was employed in order to maintain guaranteed bit rates to the extent practicable as queued input flows are multiplexed onto a single output flow.

Methods, systems, and arrangements in accordance with certain embodiment(s) of the present invention enable packet scheduling in accordance with quality of service (QoS) constraints for data flows in communications systems. In a Universal Mobile Telecommunications System (UMTS) network environment, for example, a Medium Access Control (MAC) layer schedules packet transmission of various data flows to meet stipulated criteria, including permitted transport format combinations (TFCs) from a TFC set (TFCS). In first embodiment(s), the TFC is selected based on guaranteed rate transmission rates, weighted fair queuing (WFQ) transmission rates, QoS class, transport block set size (TBSS), and optionally queue fill levels. These first embodiment(s) also further refine the selection process using backlog memories corresponding to previously unmet guaranteed and/or fair transmission rates. In second embodiment(s), memory requirements are reduced by selecting a TFC based on guaranteed rate transmission rates, QoS class, TBSS, and queue fill levels, without accommodating backlogs corresponding to previously unsatisfied requirements.

In certain first embodiment(s), a scheduling method for providing bandwidth to entities in a communications system includes the steps of: calculating a first transfer rate for multiple flows; calculating a second transfer rate for the multiple flows; ascertaining a quality of service (QoS) for each flow of the multiple flows; and assigning bandwidth to each flow of the multiple flows responsive to the first transfer rate, the second transfer rate, and the QoS for each flow of the multiple flows. In a preferred embodiment, the first transfer rate may correspond to a guaranteed rate transfer rate, and the second transfer rate may correspond to a weighted fair queuing (WFQ) transfer rate. In another preferred embodiment, the first and second transfer rates may correspond to aggregated transfer rates over the multiple flows.

In certain second embodiment(s), a scheduling method for providing bandwidth to entities in a communications system includes the steps of: ascertaining a quality of service (QoS) class that is associated with each channel of multiple channels; ascertaining a guaranteed rate transmission rate for each channel; ascertaining a queue fill level of a queue that corresponds to each channel; calculating a first score for each channel responsive to the QoS class, the guaranteed rate transmission rate, and the queue fill level. In a preferred embodiment, an additional step of calculating a second score for each channel responsive to the guaranteed rate transmission rate and the queue fill level is included.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the methods, systems, and arrangements of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1–8 of the drawings, like numerals being used for like and corresponding parts of the various drawings. Aspects of the UMTS are used to describe a preferred embodiment of the present invention. However, it should be understood that the principles of the present invention are applicable to other wireless communication standards (or systems), especially those in which communication is packet-based.

Figure 1:
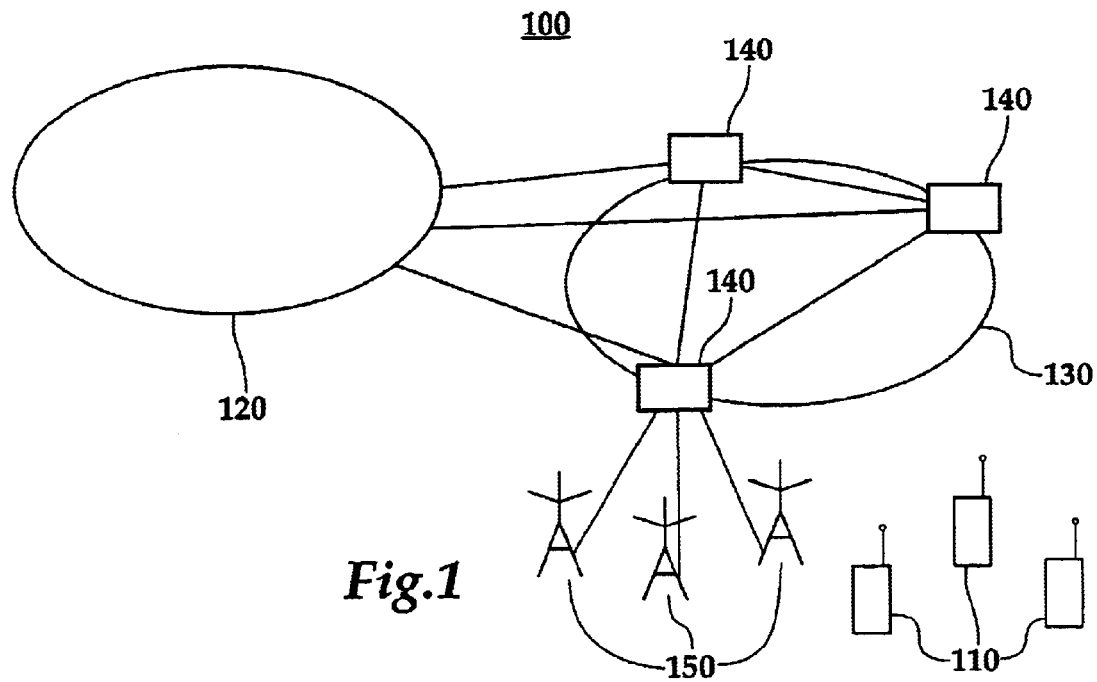
FIG. 1 illustrates an exemplary wireless communications system with which the present invention may be advantageously employed.
Figure 2:
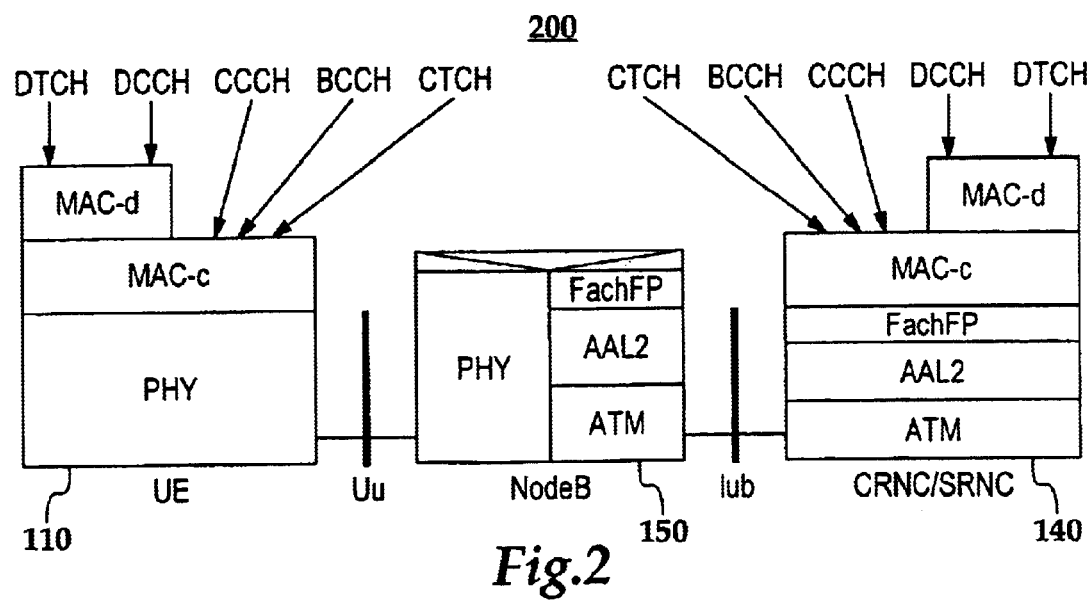
FIG. 2 illustrates a protocol model for an exemplary next-generation system with which the present invention may be advantageously employed.

Referring now to FIG. 2, a protocol model for an exemplary next-generation system with which the present invention may be advantageously employed is illustrated generally at 200. In the protocol model 200 (e.g., for a Forward Access CHannel (FACH) transport channel type), the "UU" indicates the interface between UTRAN 130 and the UE 110, and "Iub" indicates the interface between the RNC 140 and a Node B 150 (where "Node B" is a generalization of, for example, a Base Transceiver Station (BTS)). User and signaling data may be carried between an RNC 140 and a UE 110 using Radio Access Bearers (RABs) (as illustrated hereinbelow with reference to FIG. 3). Typically, a UE 110 is allocated one or more RABs, each of which is capable of carrying a flow of user or signaling data. RABs are mapped onto respective logical channels. At the Media Access Control (MAC) layer, a set of logical channels is mapped in turn onto a transport channel, of which there are two types: a "common" transport channel which is shared by different UEs 110 and a "dedicated" transport channel which is allocated to a single UE 110 (thus leading to the terms "MAC-c" and "MAC-d"). One type of common channel is the FACH. A basic characteristic of a FACH is that it is possible to send one or more fixed size packets per transmission time interval (e.g., 10, 20, 40, or 80 ms). Several transport channels (e.g., FACHs) are in turn mapped at the physical layer onto a Secondary Common Control Physical CHannel (S-CCPCH) for transmission over the air interface between a Node B 150 and a UE 110.

When a UE 110 registers with an RNC 140 via a Node B 150, that RNC 140 acts at least initially as both the serving and the controlling RNC 140 for the UE 110. (The serving RNC 140 may subsequently differ from the controlling RNC 140 in a UMTS network 100, but the presence or absence of this condition is not particularly relevant here.) The RNC 140 both controls the air interface radio resources and terminates the layer 3 intelligence (e.g., the Radio Resource Control (RRC) protocol). thus routing data associated with the UE 110 directly to and from the core network 120.

It should be understood that the MAC-c entity in the RNC 140 transfers MAC-c Packet Data Units (PDUs) to the peer MAC-c entity at the UE 110 using the services of the FACH Frame Protocol (FACH FP) entity between the RNC 140 and the Node B 150. The FACH FP entity adds header information to the MAC-c PDUs to form FACH FP PDUs which are transported to the Node B 150 over an AAL2 (or other transport mechanism) connection. An interworking function at the Node B 150 interworks the FACH frame received by the FACH FP entity into the PHY entity.

In an exemplary aspect of the scenario illustrated in FIG. 2, an important task of the MAC-c entity is the scheduling of packets (MAC PDUs) for transmission over the air interface. If it were the case that all packets received by the MAC-c entity were of equal priority (and of the same. size), then scheduling would be a simple matter of queuing the received packets and sending them on a first come first served basis (e.g., first-in, first-out (FIFO)). However, UMTS defines a framework in which different Quality of Services (QoSs) may be assigned to different RABs. Packets corresponding to a RAB that has been allocated a high QoS should be transmitted over the air interface at a high priority whilst packets corresponding to a RAB that has been allocated a low QoS should be transmitted over the air interface at a lower priority. Priorities may be determined at the MAC entity (e.g., MAC-c or MAC-d) on the basis of RAB parameters.

UMTS deals with the question of priority by providing at the controlling RNC 140 a set of queues for each FACH. The queues may be associated with respective priority levels. An algorithm, which is defined for selecting packets from the queues in such a way that packets in the higher priority queues are (on average) dealt with more quickly than packets in the lower priority queues, is implemented. The nature of this algorithm is complicated by the fact that the FACHs that are sent on the same physical channel are not independent of one another. More particularly, a set of Transport Format Combinations (TFCs) is defined for each S-CCPCH, where each TFC includes a transmission time interval, a packet size, and a total transmission size (indicating the number of packets in the transmission) for each FACH. The algorithm should select for the FACHs a TFC which matches one of those present in the TFC set in accordance with UMTS protocols.

Preferably, a packet received at the controlling RNC 140 is placed in a queue (for transmission on a FACH), where the queue corresponds to the priority level attached to the packet as well as to the size of the packet. The FACH is mapped onto a S-CCPCH at a Node B 150 or other corresponding node of the UTRAN 130. In an alternative preference, the packets for transmission on the FACH are associated with either a Dedicated Control CHannel (DCCH) or to a Dedicated Traffic CHannel (DTCH). It should be noted that, preferably, each FACH is arranged to carry only one size of packets. However, this is not necessary, and it may be that the packet size that can be carried by a given FACH varies from one transmission time interval to another.

As alluded to hereinabove, the UE 110 may communicate with the core network 120 of the UMTS system 100 via separate serving and controlling (or drift) RNCs 140 within the UTRAN 130 (e.g., when the UE 110 moves from an area covered by the original serving RNC 140 into a new area covered by a controlling/drift RNC 140) (not specifically shown). Signaling and user data packets destined for the UE 110 are received at the MAC-d entity of the serving RNC 140 from the core network 120 and are "mapped" onto logical channels, namely a Dedicated Control CHannel (DCCH) and a Dedicated traffic CHannel (DTCH), for example. The MAC-d entity constructs MAC Service Data Units (SDUS), which include a payload section containing logical channel data and a MAC header containing, inter alia, a logical channel identifier. The MAC-d entity passes the MAC SDUs to the FACH FP entity. This FACH FP entity adds a further FACH FP header to each MAC SDU, where the FACH FP header includes a priority level that has been allocated to the MAC SDU by an RRC entity. The RRC is notified of available priority levels, together with an identification of one or more accepted packet sizes for each priority level, following the entry of a UE 110 into the coverage area of the drift RNC 140.

The FACH FP packets are sent to a peer FACH FP entity at the drift RNC 140 over an AAL2 (or other) connection. The peer FACH FP entity decapsulates the MAC-d SDU and identifies the priority contained in the FRAME FP header. The SDU and associated priority are passed to the MAC-c entity at the controlling RNC 140. The MAC-c layer is responsible for scheduling SDUs for transmission on the FACHs. More particularly, each SDU is placed in a queue corresponding to its priority and size. For example, if there are 16 priority levels, there will be 16 queue sets for each FACH, with the number of queues in each of the 16 queue sets depending upon the number of packet sizes accepted for the associated priority. As described hereinabove, SDUs are selected from the queues for a given FACH in accordance with some predefined algorithm (e.g., so as to satisfy the TFC requirements of the physical channel).

The scheme described hereinbelow with reference to FIGS. 3 and 4 relates to data transmission in a telecommunications network and in particular, though not necessarily, to data transmission in a UMTS.

As noted hereinabove, the 3GPP is currently in the process of standardizing a new set of protocols for mobile telecommunications systems. The set of protocols is known collectively as the UMTS. With reference to FIG. 3, a view of an exemplary second layer architecture of an exemplary next-generation system in accordance with the present invention is illustrated generally at 300. Specifically, by way of example only, the exemplary second layer architecture 300 illustrates a simplified UMTS layer 2 protocol structure which is involved in the communication between mobile stations (e.g. mobile telephones), or more broadly UEs 110, and Radio Network Controllers (RNCS) 140 of a UMTS network 100. The RNCs 140. are analogous to the Base Station Controllers (BSCs) of existing GSM mobile telecommunications networks., communicating with the mobile stations via Node Bs 150.

The layer 2 structure of the exemplary second layer architecture 300 includes a set of Radio Access Bearers (RABs) 305 that make available radio resources (and services) to user applications. For each mobile station there may be one or several RABs 305. Data flows (e.g., in the form of segments) from the RABs 305 are passed to respective Radio Link Control (RLC) entities 310, which amongst other tasks buffer the received data segments. There is one RLC entity 310 for each RAB 305. In the RLC layer, RABs 305 are mapped onto respective logical channels 315. A Medium Access Control (MAC) entity 320 receives data transmitted in the logical channels 315 and further maps the data from the logical channels 315 onto a set of transport channels 325. The transport channels 325 are finally mapped to a single physical transport channel 330, which has a total bandwidth (e.g., of <2Mbits/sec) allocated to it by the network. Depending whether a physical channel is used exclusively by one mobile station or is shared between many mobile stations, it is referred to as either a "dedicated physical channel" or a "common channel". A MAC entity connected to a dedicated physical channel is known as MAC-d; there is preferably one MAC-d entity for each mobile station. A MAC entity connected to a common channel is known as MAC-c; there is preferably one MAC-c entity for each cell.

The bandwidth of a transport channel 325 is not directly restricted by the capabilities of the physical layer 330, but is rather configured by a Radio Resource Controller (RRC) entity 335 using Transport Formats (TFs). For each transport channel 325, the RRC entity 335 defines one or several Transport Block (TB) sizes. Each Transport Block size directly corresponds to an allowed MAC Protocol Data Unit (PDU) and tells the MAC entity what packet sizes it can use to transmit data to the physical layer. In addition to block size, the RRC entity 335 informs the MAC entity 320 of a Transport Block Set (TBS) size, which is the total number of bits the MAC entity can transmit to the physical layer in a single transmission time interval (TTI). The TB size and TBS size, together with some additional information relating to the allowed physical layer configuration, form a TF. An example of a TF is (TB=80 bits, TBS=160 bits), which means that the MAC entity 320 can transmit two 80 bit packets in a single TTI. Thus, this TF can be written as TF=(80, 160). The RRC entity 335 also informs the MAC entity of all possible TFs for a given transport channel. This combination of TFs is called a Transport Format Combination (TFC). An example of a TFC is {TF1=(80, 80), TF2=(80, 160)}. In this example, the MAC entity can choose to transmit one or two PDUs in one TTI on the particular transport channel in question; in both cases, the PDUs have a size of 80 bits.

In each TTI, the MAC entity 320 has to decide how much data to transmit on each transport channel 325 connected to it. These transport channels 325 are not independent of one another, and are later multiplexed onto a single physical channel 330 at the physical layer 330 (as discussed hereinabove). The RRC entity 335 has to ensure that the total transmission capability on all transport channels 325 does not exceed the transmission capability of the underlying physical channel 330. This is accomplished by giving the MAC entity 320 a Transport Format Combination Set (TFCS), which contains the allowed Transport Format Combinations for all transport channels.

By way of example, consider a MAC entity 320 which has two transport channels 325 that are further multiplexed onto a single physical channel 330, which has a transport capacity of 160 bits per transmission time interval (It should be understood that, in practice, the capacity will be much greater than 160). The RRC entity 335 could decide to assign three transport formats TF1=(80, 0), TF2=(80, 80) and TF3=(80, 160) to both transport channels 325. Clearly however, the MAC entity 320 cannot choose to transmit on both transport channels 325 at the same time using TF3 as this would result in the need to transmit 320 bits on the physical channel 330, which has only a capability to transmit 160 bits. The RRC entity 335 has to restrict the total transmission rate by not allowing all combinations of the TFs. An example of this would be a,TFCS as follows [{ (80, 0), (80, 0)}, { (80, 0), (80, 80)}, { (80, 0), (80, 160)}, { (80, 80), (80, 0)}, { (80, 80), (80, 80)}, { (80, 160), (80, 0)}], where the transport format of transport channel "1" is given as the first element of each element pair, and the transport format of transport channel "2" is given as the second element. As the MAC entity 320 can only choose one of these allowed transport format combinations from the transport format combination set, it is not possible to exceed the capability of the physical channel 330.

An element of the TFCS is pointed out by a Transport Format Combination Indicator (TFCI), which is the index of the corresponding TFC. For example, in the previous example there are 6 different TFCs., meaning that the TFCI can take any value between 1 and 6. The TFCI=2 would correspond to the second TFC, which is { (80, 0), (80, 80)}, meaning that nothing is transmitted from the first transport channel and a single packet of 80 bits is transmitted from the second transport channel.

It is of course necessary to share the total available bandwidth between the logical channels 315. The decision to distribute the bandwidth to different transport channels is made by the MAC entity 320 for each transmission time interval by choosing a suitable TFCI. This sharing of bandwidth can be done in several ways, for example by giving an absolute preference to flows which are considered to be more important than others. This would be the easiest method to implement, but can result in a very unfair distribution of the bandwidth. Specifically, it is possible that flows that have lower priorities. are not allowed to transmit for prolonged periods of time. This can result in extremely poor performance if the flow control mechanism of a lower priority flow reacts to this. A typical example of such a flow control mechanism can be found in the present day Transmission Control Protocol (TCP) protocol used in the Internet. In existing technologies, such as Internet Protocol (IP) and Asynchronous Transfer Mode (ATM) networks, provision is made for allocating resources on a single output channel to multiple input flows. However, the algorithms used to share out the resources in such systems are not directly applicable to UMTS where multiple input flows are transmitted on respective logical output channels.

Sharing resources between multiple input data flows is referred to as Generalized Processor Sharing (GPS). This GPS, when employed in systems having only a single output channel, is known as Weighted Fair Queuing (WFQ) and is described in a paper entitled "A Generalised Processor Sharing Approach to Flow Control in Integrated Services Networks: The Single Node Case", A. K. Parekh, R. G. Gallager, published in IEEE/ACM Transactions On Networking, Vol. 1, No. 3, Jun. 1993, Pp. 344–357. Stated simply, GPS involves calculating a GPS weight for each input flow on the basis of certain parameters associated with the flow. The weights calculated for all of the input flows are added together, and the total available output bandwidth is divided amongst the input flows depending upon the weight of each flow as a fraction of the total weight according to, for example, the following formula:

$$\text{rate}\_i = \text{weight}\_i / (\text{sum}\_\text{of}\_\text{all}\_\text{active}\_\text{weights}) * \text{maximum}\_\text{rate}.$$

GPS could be applied to the MAC entity in UMTS, with the weighting for each input flow being determined (by the RRC entity) on the basis of certain RAB parameters, which are allocated to the corresponding PAB by the network. In particular, an RAB, parameter may equate to a Quality of Service (QoS) or Guaranteed rate allocated to a user for a particular network service.

Figure 3:
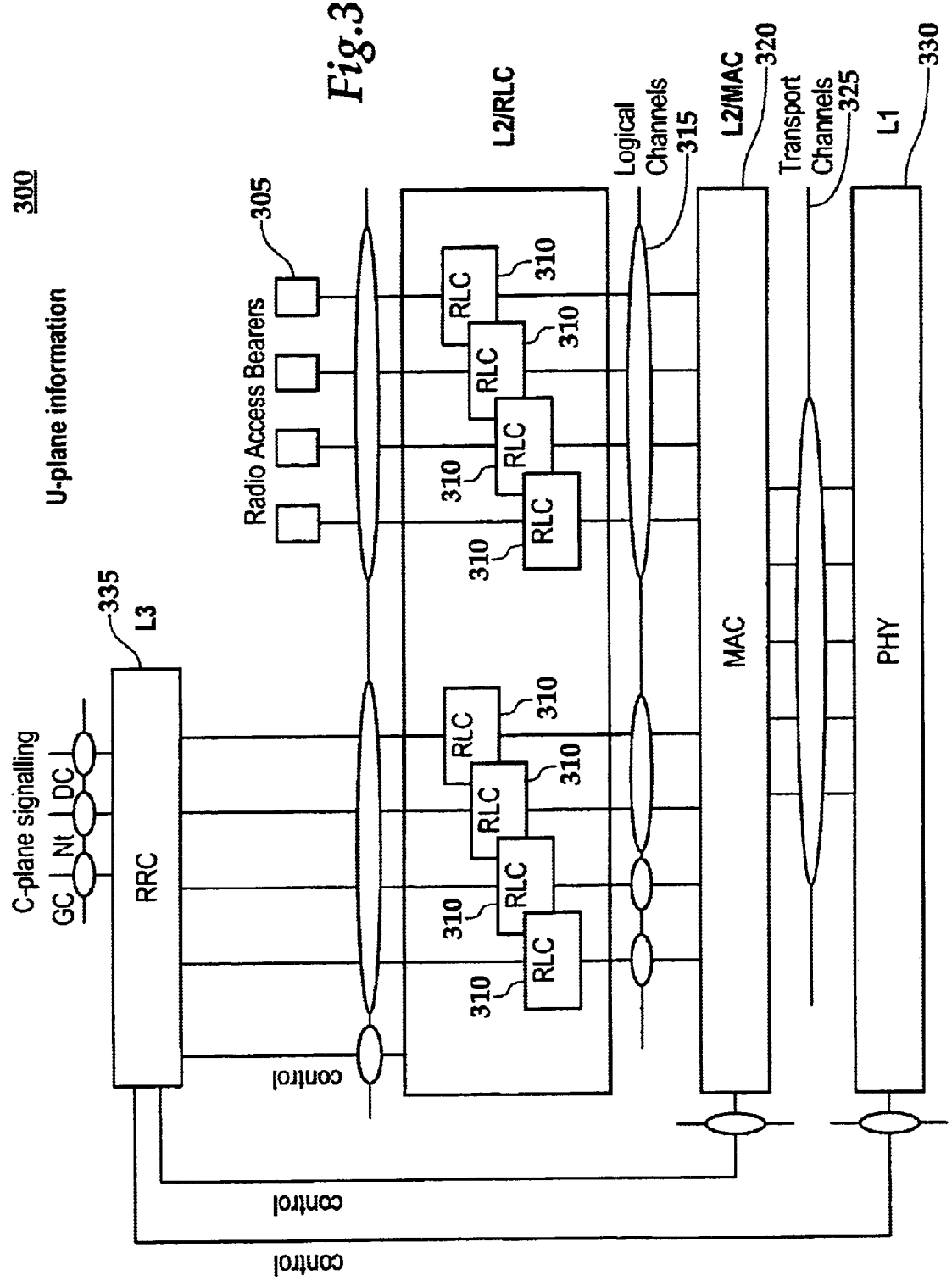
FIG. 3 illustrates a view of an exemplary second layer architecture of an exemplary next-generation system in accordance with the present invention.
Figure 4:
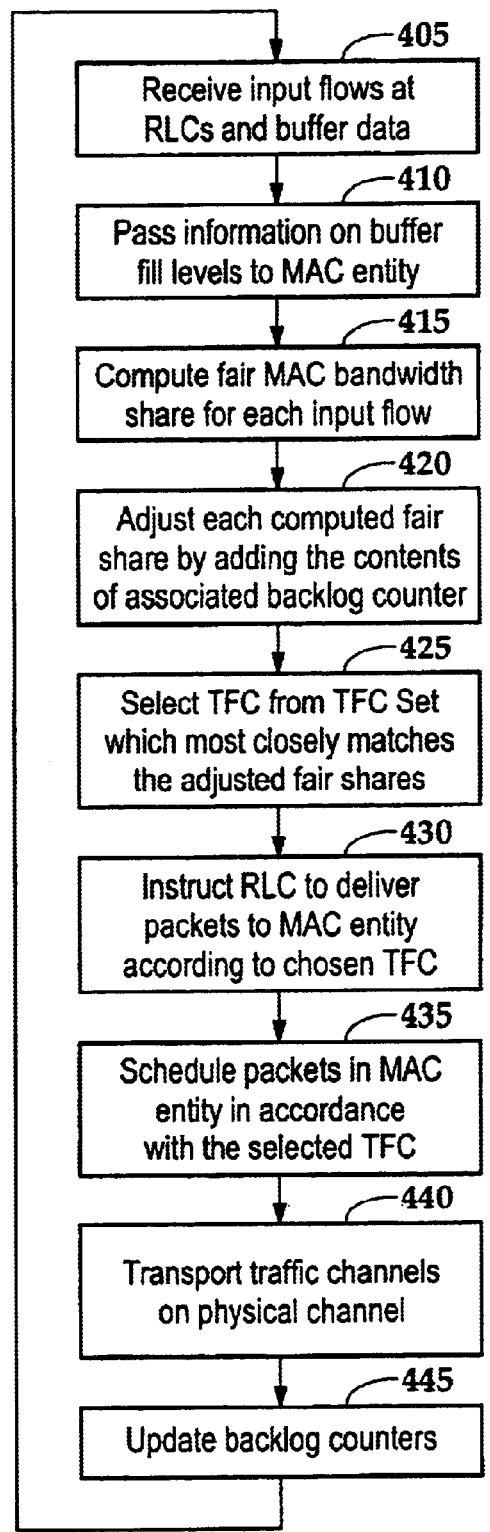
FIG. 4 illustrates an exemplary method in flowchart form for allocating bandwidth resources to data flow streams between entities in the exemplary second layer architecture of FIG. 3.

Continuing now with the scheme described herein with reference to FIGS. 3 and 4, it was realized that there are difficulties involved in applying GPS directly to bandwidth allocation in a UMTS network, as GPS assumes that data can be sent on the MAC entity logical channels in infinitely small blocks. This is not possible in UMTS, as UMTS relies upon Transport Format Combinations Sets (TFCSs) as the basic mechanism defining how much data can be sent in each TTI. If GPS is to be employed in UMTS, it is necessary to select the TFC (from the TFCS) which most closely matches the bandwidth allocated to an input flow by GPS. The result of this approach is that the actual amount of data sent for an input stream in a given frame either may fall below the optimized rate or may exceed that optimized rate. In the former case, a backlog of unsent data may build up for the input flow.

It is an object of the scheme described herein with reference to FIGS. 3 and 4 to overcome, or at least mitigate, the disadvantage noted in the preceding paragraph. This and other objects are achieved at least in part by maintaining a backlog counter which keeps track of the backlog of unsent data for a given input flow to the MAC entity. The backlog is taken into account when determining an appropriate TFC for that input flow for a subsequent frame. According to a first aspect of this scheme, there is provided a method of allocating transmission resources at a Media Access Control (MAC) entity of a node of a Universal Mobile Telecommunications System (UMTS), the method including the following steps for each frame of an output data flow: computing for each input flow to the MAC entity a fair share of the available output bandwidth of the MAC entity; selecting a Transport Format Combination (TFC) from a TFC Set (TFCS) on the basis of the bandwidth share computed for the input flows, where the TFC includes a Transport Format allocated to each input flow; and for each input flow, if the allocated TF results in a data transmission rate which is less than the determined fair distribution, adding the difference to a backlog counter for the input flow, where the value of the backlog counter(s) is taken into account when selecting a TFC for the subsequent frame of the output data flow. Embodiments of this scheme allow the TFC selection process for a subsequent frame to take into account any backlogs which exists for the input flows. The tendency is to adjust the selected TFC to reduce the backlogs. Such a backlog may exist due to the finite number of data transmission possibilities provided for by the TFCS. Nodes at which the method of this scheme may be employed include mobile stations (such as mobile telephones and communicator type devices) (or more generally UEs) and Radio Network Controllers (RNCs).

Preferably, the input flows to the MAC entity are provided by respective Radio Link Control (RLC) entities. Also preferably, each RLC entity provides buffering for the associated data flow. Also preferably, the step of computing a fair share of resources for an input flow is carried out by a Radio Network Controller (RNC) entity. Also preferably, the step of computing a fair share of resources for an input flow includes the step of determining the weighting given to that flow as a fraction of the sum of the weights given to all of the input flows. The fair share may then be determined by multiplying the total output bandwidth by the determined fraction. Also preferably, this step may involve using the Generalised Processor Sharing (GPS) mechanism. The weighting for a data flow may be defined by one or more Radio Access Bearer (RAB) parameters allocated to a RAB by the UMTS network, where the RAB is associated with each MAC input flow. Also preferably, in the event that the backlog counter for a given input flow has a positive value, the method further includes the step of adding the value of the backlog counter to the computed fair share for that flow and selecting a TFC on the basis of the resulting sums for all of the input flows.

In certain embodiments of the scheme described herein with reference to FIGS. 3 and 4, where, for a given input flow, the allocated TF results in a data transmission rate that is more than the determined fair distribution, the difference may be subtracted from the backlog counter for the input flow. According to a second aspect of this scheme, there is provided a node of a Universal Mobile Telecommunications System (UMTS), the node including: a Media Access Control.(MAC) entity for receiving a plurality of input data flows; first processor means for computing for each input flow to the MAC entity a fair share of the available output bandwidth of the MAC entity and for selecting a Transport Format Combination (TFC), from a TFC Set (TFCS), on the basis of the bandwidth share computed for the input flows, where the TFC includes a Transport Format allocated to each input flow; second processor means for adding to a backlog counter associated with each input flow the difference between the data transmission rate for the flow resulting from the selected TFC and the determined fair share, if the data transmission rate is less than the determined fair share, where the first processor means is arranged to take into account the value of the backlog counters when selecting a TFC for the subsequent frame of the output data flow. Preferably, the first and second processor means are provided by a Radio Network Controller (RNC) entity.

As is described herein with reference to FIG. 3, a simplified UMTS layer 2 includes one Radio Resource Control (RRC) entity, a Medium Access Control (MAC) entity for each mobile station, and a Radio Link Control (RLC) entity for each Radio Access Bearer (RAB) The MAC entity performs scheduling of outgoing data packets, while the RLC entities provide buffers for respective input flows. The RRC entity sets a limit on the maximum amount of data that can be transmitted from each flow by assigning a set of allowed Transport Format Combinations (TFC) to each MAC (referred to as a TFC Set or TFCS), but each MAC must independently decide how much data is transmitted from each flow by choosing the best available Transport Format Combination (TFC) from the TFCS.

With reference now to FIG. 4, an exemplary method in flowchart form for allocating bandwidth resources to data flow streams between entities in the exemplary second layer architecture of FIG. 3 is illustrated generally at 400. The flowchart 400 is a flow diagram of a method of allocating bandwidth resources to, for example, the input flow streams of a MAC entity of the layer 2 of FIG. 3. Generally, an exemplary method in accordance with the flowchart 400 may follow the following steps. First, input flows are received at RLCs and the data is buffered (step 405). Information on buffer fill levels is passed to the MAC entity (step 410). After the information on buffer fill levels is passed, the fair MAC bandwidth share for each input flow is computed (step 415). The computed fair share of each is then adjusted by adding the contents of an associated backlog counter to the respective computed fair share (step 420). Once the computed fair shares have been adjusted, a TFC is selected from the TFC set to most closely match the adjusted fair shares (step 425). The RLC is next instructed to deliver packets to the MAC entity according to the selected TFC (step 430). The MAC entity may also schedule packets in accordance with the selected TFC (step 435). After packet scheduling, the traffic channels may be transported on the physical channel(s) (step 440). Once packet traffic has been transported, the backlog counters should be updated (step 445). The process may continue (via arrow 450) when new input flows are received at the RLCs, which buffer the data (at step.405).

Furthermore, certain embodiment (s) of the scheme operate by calculating at the MAC entity, on a per Transmission Time Interval (TTI) basis, the optimal distribution of available bandwidth using the Generalised Processor Sharing (GPS) approach (See, e.g., the article by A. K. Parekh et al. referenced hereinabove.) and by keeping track of how far behind each flow is from the optimal bandwidth allocation using respective backlog counters. The available bandwidth is distributed to flows by using the standard GPS weights, which may be calculated by the RRC using the RAB parameters.

The method may first calculate the GPS distribution for the input flows and add to the GPS values the current respective backlogs. This is performed once for each 10 ms TTI and results in a fair transmission rate for each flow. However, this rate may not be optimal as it may happen that there is not enough data to be sent in all buffers. In order to achieve optimal throughput as well as fairness, the fair GPS distribution is reduced so as to not exceed the current buffer fill level or the maximum allowed rate for any logical channel. A two step rating process is then carried out.

First, the set of fair rates computed for all of the input flows is compared against possible Transport Format Combinations (TFCs). in turn, with each TFC being scored according to how close it comes to sending out the optimal rate. In practice this is done by simply counting how much of the fair configuration a TFC fails to send (if a given TFC can send all packets at the fair rate, it is given a score of zero) and then considering only the TFCs which have the lowest scores. The closest match is chosen and used to determine the amount of packets sent from each queue. TFCs having an equal score are given a bonus score according to how many extra bits they can send (this can be further weighted by a Quality of Service rating in order to ensure that the excess capacity goes to the bearer with the highest quality class). The final selection is based on a two-level scoring: the TFC with the lowest score is taken. If there are several TFCs with an equal score, the one with the highest bonus score is chosen. This ensures that the rate for each TTI is maximized. Fairness is achieved by checking that if the chosen TFC does not give all flows at least their determined fair rate, the missing bits are added to a backlog counter of the corresponding flow and the selection is repeated for the next TTI. If any of the flows has nothing to transmit, the backlog is set to zero.

This algorithm can be shown to provide bandwidth (and, under certain assumptions; delay bounds) that is close to that of GPS. However, it remains fair and maintains isolation between all flows. It is also computationally simpler than Weighted Fair Queuing algorithms because it utilizes the fact that the MAC layer ran transmit on several transport channels at the same time. This results in optimal 10 or close to optimal utilization of the radio interface in the UMTS radio link. The following pseudo-code is an outline of an exemplary algorithm for implementing the scheme described hereinabove with reference to FIGS. 3 and 4:

```
/*
* GPS based TFC selection. Schedules packets by optimizing the throughput
* while still keeping the fairness (i.e. guaranteed rates).
int sched_gps( ) {
   double weight, weight_sum;
   double score, bonus_score;
   double min_score=HUGE_NUMBER;
   double max_bonus_score=0;
   int maxrate;
   int i,j;
   int tfc, tfci, qf, rate, trch;
   int tfc to_use_;
   double backlog[MAX_TRCH];
   double gps_req[MAX_TRCH];
   double gps_req_comp[MAX_TRCH];
   /* First calculate the sum of the weights of all active
      queues */
   weight_sum=0;
   for (trch=0; trch<MAX_TRCH; trch++) {
      if (queue_fill_state[trch]>0) {
         weight_sum+=weight_vector[trch];
      }
   }
   /* Then calculate the fair distribution of available bandwidth
    * using GPS. Modify the GPS scheduling reducing the rate if there
    * is not enough data in the buffers or if the scheduled rate is
    *higher that the maximum rate for a given logical channel
    */
   int gps_rate=0;
   for(trch=0; trch <MAX_TRCH; trch++) {
   if(queue_fill_state [trch]==0) {
      backlog[trch]=0;
   }
   // here we calculate how many bits we should send on each channel
   // by GPS
   gps_req[trch]=0;
   gps_req comp[trch]=0;
   if(queue_fill_state[trch]>0) {
      weight=weight_vector[trch];
      gps_req[trch]=weight/weight_sum*maxrate+backlog[trch];
      gps_req_comp[trch]=gps_req[trch];
      if (gps_req_comp[trch]>queue_fill_state[trch]; {
         gps_req_comp[trch]=queue_fill_state[trch];
      }
      if (gps_req_comp[trch]>trch_max_rate[trch]) {
         gps_req_comp[trch}=trch_max_rate[trch];
      }
   }
   }
   /* Now we have our basis for selecting the TFC. Score all available
    * TFCs by calculating how far they are from the modified GPS
    * result. If there are several TFCs that can send the whole GPS
    * result (or are
    * equally close) choose the one that maximises the throughput of
    * highest QoS class. Note that the TFCIs are assumed to be in
    * increasing order regarding the bandwidth usage
    */
   for (tfci=o; tfci<MAX_TPCI; tfci++) {
   rate=score=bonus_score=0;
   for (trch=0; trch<MAX_TRCH; trch+-+) {
      int tbs=tfcs [trch][tfci][0];
      int tbss=tfcs [trch][tfci][1];
      rate+=tbss;
      if (tbss<gps_req_comp[trch]) {
         score+=gps_req_comp [trch]-tbss;
      } else {
         if (tbss<=queue_fill_state[trch]) {
            bonus_score+=QoS vector[trch]*(tbss-gps_req_comp[trch]);
         }
      }
   }
   if (score<min_score) {
   tfc_to_use=tfci,
   min_score=tfcScore;
   max_bonus_score=bonus_score;
```

```
    }
    if (score==min_score && bonus_score>max-bonus-
score) {
        tfc_to_use=tfci;
        min_score=score;
        max_bonus_score=bonus_score;
    }
}
/* Now we have chosen the TFC to use. Update the
backlog and output the
 * right TFCI
 */
for (trch =0trch<MAX_TRCH; trch++) {
    tbss=tfcs [trch][tfcToUse][1];
    if (tbss<queue_fill_state) {
        if(gps_req [trch]--gps_rec_comp[trch]){
            backlog [trch]=gpsReq [trch]-tbss;
            if (backlog[trch]<0) backlog[trch]=0;
        } else {
            backlog[trchG1 ]=0;
        }
    }
}
return tfc_to_use;
}
```

Figure 5:
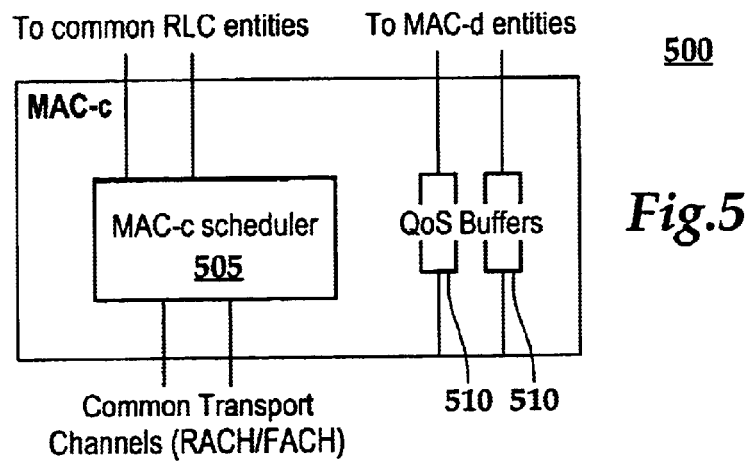
FIG. 5 illustrates an exemplary environment for scheduling data flows in accordance with the present invention.

Referring now to FIG. 5, an, exemplary environment for scheduling data flows in accordance with the present invention is illustrated generally at 500. A model of a MAC-c entity 500 is illustrated as being in communication with common RLC entities, MAC-d entities, and common transport channels (e.g., RACH/FACH). AMAC-c scheduler 505 schedules the forwarding of packets (or more generally segments) from QoS buffer s 510, which receive MAC PDUs from MAC-d entities. As alluded to hereinabove, the MAC layer of UMTS schedules packets in a manner such that the total QoS provided to the end user fulfills the guarantees given when the corresponding RAB was established. On aspect of this scheduling is the requirement that each flow receive the agreed-upon QoS. Because it is possible to multiplex several input flows (e.g., logical channels) on to one output channel (e.g., a transport channel), previously-known scheduling algorithms for the UMTS MAC-layer are not directly applicable.

In accordance with certain embodiment(s) of the present invention, a two-level scheduling algorithm is applied, which enables the implementation of fair scheduling in environments in which the MAC needs to perform multiplexing. The two-level scheduling enables the provision of an arbitrary QoS to all flows that are multiplexed onto a single output channel. It should be noted that the MAC-c entity 500 may be incorporated in, and thus the principles of the present invention may be applied with, the UMTS MAC layer in an RNC, a UE, etc.

In accordance with certain embodiment(s) of the present invention, relevant parameters for each logical channel are first received as input. A backlog counter (value) for each logical channel is maintained. In order to apply a fair queuing mechanism, these parameters are converted to GPS weights. There may be one or alternatively several different levels of weights for each flow. Second, weights for each transport channel are calculated by adding the weights for each logical channel to be multiplexed onto each corresponding transport channel. Third, scheduling is performed by choosing the best TFC according to, for example, the original GPS-based scheduling method. Fourth, the TBSS given to a transport channel is distributed to corresponding logical channels by using, for example, essentially a similar process as in step 3 for choosing the TFC. It should be noted that this is now simpler because there are no longer any restrictions on the available TFCs. Fifth, the backlog (value) is updated for each logical channel. This guarantees that each logical channel will get. its respective fair share of the total bandwidth, regardless of multiplexing.

Certain embodiment(s) in accordance with the present invention are described below in the context of variables that approximate a pseudo-code format. It should be noted that this description assumes that all logical channels to be multiplexed onto single transport channel have an equal TBS. However, it should be understood that generalization to the case of unequal block sizes may be made by one of ordinary skill in the art after reading and understanding the principles of the present invention.

The following parameters are advantageously provided as input:

1. tfcs [trch][tfci]: A two-dimensional array containing the TFCS. Each element of the array is a vector containing two integers, the TBS and the TBSS. It is assumed that the TFCS is stored in such a way that the most significant index is the Transport Channel Identifier.

2. max_rate: The maximum rate that can be transmitted on all transport channels. Note that this is not typically the same as the sum of the maximum rates on each transport channel, as the transport capability on FACH or DCH channels is limited by the transport capability of the physical common channel. This is preferably calculated directly from the TFCS every time the TFCS is modified and/or limited.

3. trch max_rate [trch]: An array that contains the maximum rate for each transport channel. This parameter, while actually optional, is used to ensure that if the guaranteed rate is higher than the maximum transport rate, i then the backlog for the respective flow is not accumulated and the excess data rate can be given to other flow(s) This parameter is preferably calculated directly from the TFCS every time the TFCS is modified and/or limited.

4. lch_qos_class [lch]: An array containing the QoS class for each input flow ("logical channel"). This array is preferably re-computed when new input flows are added or old flows are removed.

5. lch_guar_rate [lch]: An array containing the guaranteed rate for each input flow ("logical channel") This array is preferably re-computed when new input flows are added or old flows are removed.

6. lch_trch_map [lch]: An array containing the transport channel indicator for each input flow ("logical channel"). This array defines how the input flows are multiplexed to transport channels, and thus provides a mapping from logical channel to corresponding transport channel. This parameter is preferably re-computed when new input flows are added or old flows are removed.

7. lch_queue_fill [lch]: An array containing the number of packets in the. input buffer for each incoming flow. This is the maximum number of packets that can be transmitted from this incoming flow ("logical channel") in this TTI. If more than this number is requested, then the RLC can provide padding, but for packets in QoS buffers (e.g., QoS buffers 510) this is not possible. This parameter is preferably updated before each scheduling decision.

8. lch_pu_size [lch]: An array containing the size of the packets in the input buffers for each incoming flow. This parameter may be updated only when the size of the packets/PDUs change, or when new channels are added.

From the above eight (8) parameters, the following three (3) additional parameters may be calculated:

1. trch_qos_class [trch]: An array containing the maximum QoS class of all input flows ("logical channels")

multiplexed to a given transport channel. This array is preferably re-computed whenever lch_qos_class or lch_trch_map is changed.

2. trch_guar_rate [trch]: An array containing the sum of guaranteed rate of all input flows ("logical channels") multiplexed to a given transport channel. This array is preferably re-computed whenever lch_guar_rate is changed.

3. trch_queue_fill [trch]: An array containing the total number of bits that can be transmitted from any transport channel. This array is preferably updated for every scheduling decision.

This exemplary version of the exemplary scheduling algorithm preferably employs two (2) "external" arrays, which may be stored at memory in between the scheduling decisions. Both of these arrays are updated once per scheduling decision:

1. lch_gr_backlog [lch]: An array containing the current guaranteed rate backlog (i.e., how far behind the guaranteed rate this flow is) for each logical channel. This backlog may be specified in bits.

2. lch_wfq_backlog [lch]: An array containing the current fair queuing backlog (i.e., how for behind the WFQ scheduling this flow is) for each logical channel. This backlog may be specified in bits.

From the above two (2) backlog arrays, two (2) more backlog arrays are preferably calculated for each scheduling decision:

1. trch_gr_backlog [trch]: An array containing the sum of all current guaranteed rate backlogs of the logical channels multiplexed to a given transport channel.

2. trch_wfq_backlog [trch]: An array containing the sum of all current fair queuing backlogs of the logical channels multiplexed to a given transport channel.

Figure 6:
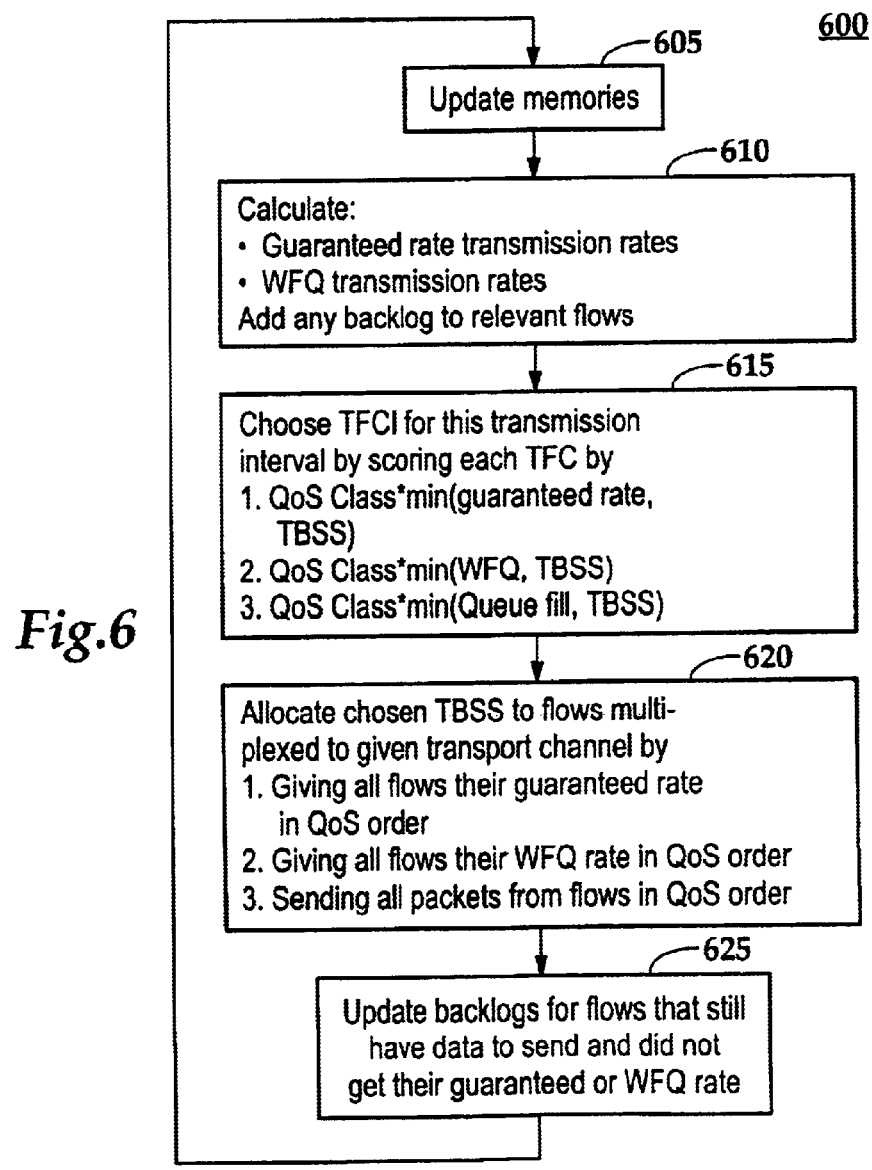
FIG. 6 illustrates an exemplary method in flowchart form for scheduling data flows in accordance with the present invention.

Referring now to FIG. 6, an exemplary method in flowchart form for scheduling data flows in accordance with the present invention is illustrated generally at 600. The flowchart 600 indicates in some detail an exemplary method for employing a two-step scheduling algorithm. The two-step scheduling algorithm operates responsive to both the guaranteed rates and the fair queuing amounts of each flow.

The two-step scheduling algorithm (i) selects a TFCI based on three variables and (ii) allocates the resulting TBSS in an order responsive to each flows QoS.

The exemplary method works by first updating the trch_gr_backlog and trch_wfq_backlog counters and the trch_queue_fill memory. (Step 605.) Next, two reference (e.g., so-called "optimal") transport format combinations, tfc_gr and tfc_wfq, are calculated. (Step 610) The tfc_gr is the sum of the guaranteed rate and any possible guaranteed rate backlog for all logical channels multiplexed to this transport channel:

tfc_gr[trch]=guar_rate[trch]+trch_gr_backlog[trch]

Thus the tfc_gr is a transport format combination that would transmit enough bits from all incoming flows in order to give each their respective guaranteed rate. The backlog value ensures that if any flow cannot transmit its guaranteed rate, then its share of the bandwidth is increased.

In order to provide optimal service, two special cases should be noted. First, if the tfc_gr indicates a transmission rate that is larger than the maximum rate for any transport channel (e.g., if tfc_gr [trch]>tr_max_rate [trch]), then the tfc_gr value is preferably reduced to the value of tr_max_rate. Second, if the tfc_gr value is greater than the number of bits that are buffered for this transport channel (e.g., if tfc_gr [trch]> trch_queue_fill [trch]), then the tfc_gr value is preferably reduced to the trch_queue_fill value.

This ensures that no unnecessary padding is requested. (It also ensures that if any flow has nothing to send, then nothing will be requested.)

The tfc_wfq variable is similar to the TFC that gives a fair queuing result according to the QoS classes. However, the calculation of the tfc_wfq variable is slightly more complicated than for the tfc_gr variable. First, the sum of the QoS classes of all active flows is calculated (a flow may be defined as "active" if it has at least one packet to send):

qos_sum=Σtrch_qos_class[trch], where the sum is over all the transport channels that have trch_queue_fill [trch]>0. Second, the fair scheduling can then be calculated by:

tfc_wfq[trch]=max_rate*trch_qos_class[trch]/qos_sum

The fair scheduling TFC should also be further modified by taking into account any possible backlog:

tfc_wfq[trch]=tfc_wfq[trch]+trch_wfq_backlog[trch].

As is explained hereinabove with respect to tfc_gr and the providing of optimal service, the tfc_wfq [trch] is preferably further modified to ensure that the WFQ scheduling does not request more bandwidth than that defined by the max_trch_rate value and/or the trch_queue_fill value (e.g., in bits).

Once the two reference TFCs have been calculated, the TFCS is scanned through and every TFC is given three scores according to (i) how close the TFC is to tfc_gr, (ii) how close the TFC is to tfc_wfq, and (iii) how much of the excess bandwidth the TFC allocates to flows with different QoS classes. (Step 615.) The scores are determined as follows:

gr_score=Σqos_class[trch]*min(tbss, tfc_gr);

wfq_score=Σqos_class[trch]*min(tbss, tfc_wfq); and bonus_score=Σqos_class[trch]*min(trch_queue_fill, tbss-max-(tfc_gr, tfc_wfq)).

Thus the gr_score and the wfq_score increase up to a maximum that is reached when tbss >=tfc_gr and tfc_wfq, respectively, while the bonus_score increases always when tbss<trch_queue_fill.

In certain embodiment(s), these three scores are ranked in a defined priority. First, the TFCI that maximizes the gr_score is selected. Second, if there are several TFCIs with the same gr_score, then the TFCI that maximizes the wfq_score is selected. Third, if there are still several choices left (i.e., several TFCIs have the same wfq_score as well as the same gr_score), then the TFCI with the maximum bonus_score is chosen. This three-tiered selection process ensures that all the guaranteed rates are served first. If this is not possible, then the flows with the highest quality of service class are scheduled because the score is multiplied by "qos_class". If all guaranteed rates can be provided, then a fair allocation is tried as well. If this is not possible, as much bandwidth as possible is given to flows with the highest priorities. Finally, if there is any excess bandwidth after fair scheduling (e.g., typically because one of the higher priority flows has only a few bits buffered for this TTI), the excess bandwidth is given to the flow which has the highest priority and still has data to send.

Once the TFCI (and thus the amount of data to be transmitted on each transport channel) has been selected, the amount of data to be transmitted from each transport channel is mapped to logical channels using that particular transport channel. This, at least in principle, is a separate scheduling problem in which the TBSS is allocated to flows that are multiplexed to corresponding transport channels. If transport channels are analyzed only one at time, the situation is analogous to those of an IP/ATM router, where several flows of different QoS classes share a single output channel. This suggests that a well-tested method like WFQ may be employed for multiplexing several logical channels to single transport channel.

However, in accordance with the principles of the present invention, two backlog counters are already present. These two backlog counters can ensure a guaranteed rate and a fair allocation on average for each logical channel, so a simpler alternative is available. Specifically, the TBSS is divided between logical channels by a three-stage process. (Step 620.) First, check if the TBSS is smaller than the trch_guar_rate. If so, give the flow with the highest priority the lch_guar_rate bits, give the flow with the second highest priority the second lch_guar_rate, etc. until the whole TBSS has been allocated. Second, if the TBSS is larger than the trch_guar_rate, all flows are given their respective guaranteed rate. Third, check if the TBSS is smaller than tfc_wfq. If it is, first allocate to the flow with the highest priority its respective fair share (e.g., lch_qos_class/qos_sum*max_rate), then second allocate to the flow with the second highest priority its respective fair share, etc. until the whole TBSS has been allocated. Finally, if the TBSS is larger than the tfc_wfq, all flows can automatically receive their respective fair share, and the excess bandwidth may be given to the flow or flows with the highest priority or priorities.

The appropriate TFCI has been determined as well as how much data should be requested from each input flow. However, it should also be ensured that each logical channel will, on average, receive both the guaranteed rate and its respective fair allocation of the bandwidth. (Step 625.) This may be accomplished by checking if any logical channel has transmitted less than lch_quar_rate and by adding the difference to gr_backlog. A similar procedure may be applied to and for wfq_backlog. If any flow transmits less than lch_qos_class/qos_sum*max_rate bits, the difference is added to wfq_backlog. It should be noted that if any flow transmits all the packets it had (previously) buffered, then its backlog is re-set to zero. This "zeroing" of the backlog guarantees that no flow can accumulate excess backlog and take advantage of it later at the expense of other flows.

Figure 7:
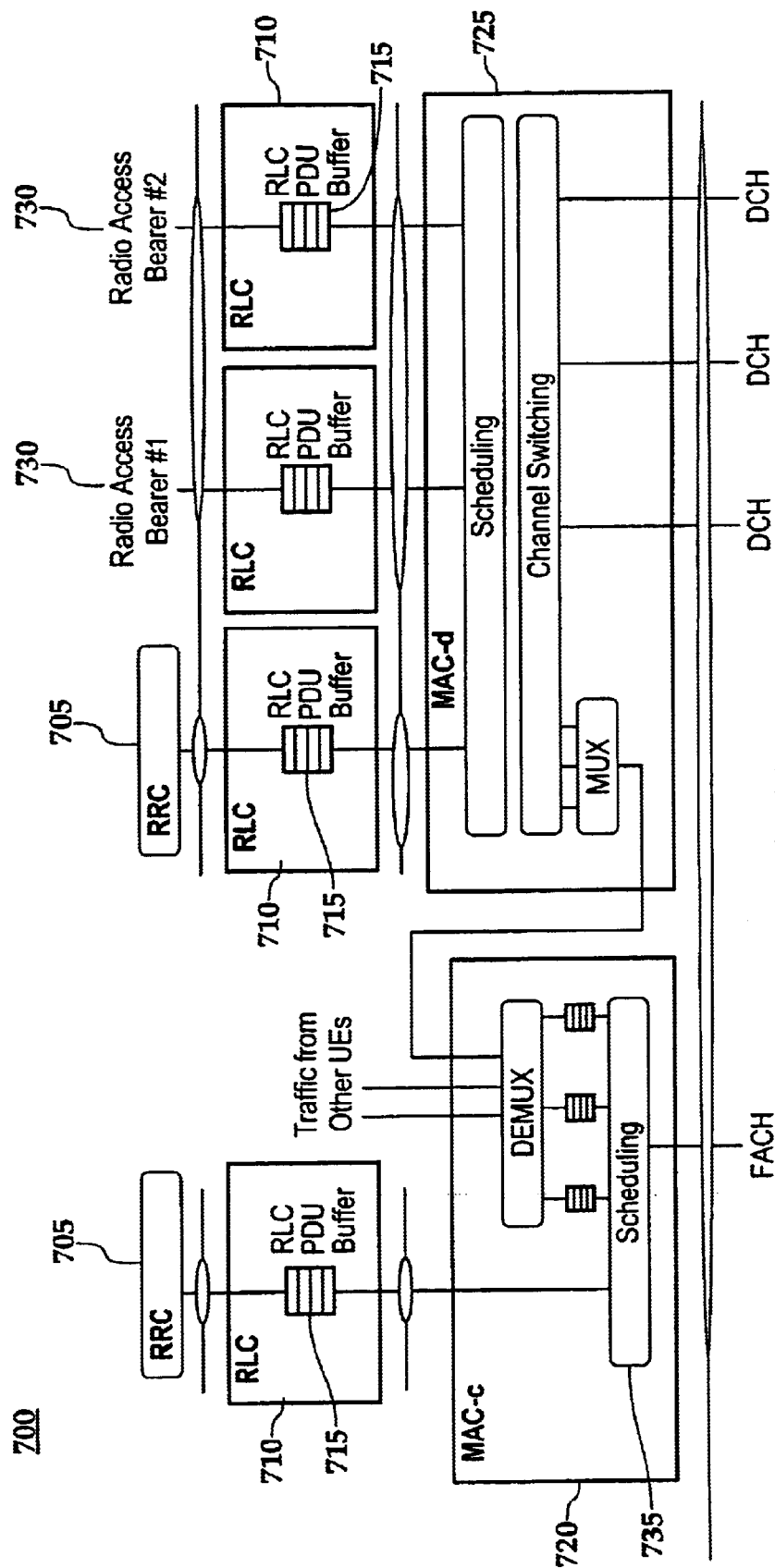
FIG. 7 illustrates another view of the exemplary second layer architecture of an exemplary next-generation system in accordance with the present invention.

Referring now to FIG. 7, another view of the exemplary second layer architecture of an exemplary next-generation system in accordance with the present invention is illustrated generally at 700. The exemplary second layer architecture 700 includes additional details regarding elements of, and interrelationships between, various aspects of the second layer architecture of, for example, the Universal Mobile Telecommunications System (UMTS). Each illustrated Radio Resource Control (RRC) element 705 is connected to one or more Radio Link Controllers (RLCs) 710. Each illustrated RLC 710 includes at least one RLC Packet Data Unit (PDU) Buffer 715. The RLCs 710 are connected to respective common channel Medium Access Control (MAC-c) element(s)/layer 720 or dedicated channel Medium Access Control (MAC-d) element(s)/layer 725. The MAC-c, MAC-d, and RLC layers of UMTS may be located, for example, in a Radio Network Controller (RNC) 140 (of FIG. 1) of the UTRAN 130, a User Equipment (UE) 110, etc.

As noted hereinabove, the MAC layer of UMTS preferably schedules packets so that the total Quality of Service (QoS) provided to the end user fulfills the guarantees given when the Radio Access Bearer (RAB) 730 was established. One resulting issue is guaranteeing (e.g., different) guaranteed bit rates to services having different QoS classes. It is preferable to guarantee that, if possible, all flows are given their guaranteed bit rate regardless of their QoS class. If this is not possible (e.g., due to high demand), then the flows with the higher (or highest) QOS classes are preferably given their respective guaranteed rates. Certain embodiment(s) of the present invention approach this problem of providing all flows a guaranteed bit rate by following a two-step scheduling process in a scheduler 735 located in the MAC layer. This two-level scheduling process guarantees that, if at all possible, all flows receive their guaranteed bit rates and also ensures that the guaranteed bit rates of the higher (and highest) priority flows are maintained as long as possible. Advantageously, these embodiment(s) may be implemented in the RNC node, the UE (node), etc.

In each TTI, the MAC entity has to decide how much data to transmit on each transport channel connected to it. These transport channels are not independent of one another, and are later multiplexed onto a single physical channel at the physical layer (as discussed hereinabove). The RRC 705 entity has to ensure that the total transmission capability on all transport channels does not exceed the transmission capability of the underlying physical channel. This is done by giving the MAC entity a TFCS, which contains the allowed TFCs for all transport channels.

Figure 8:
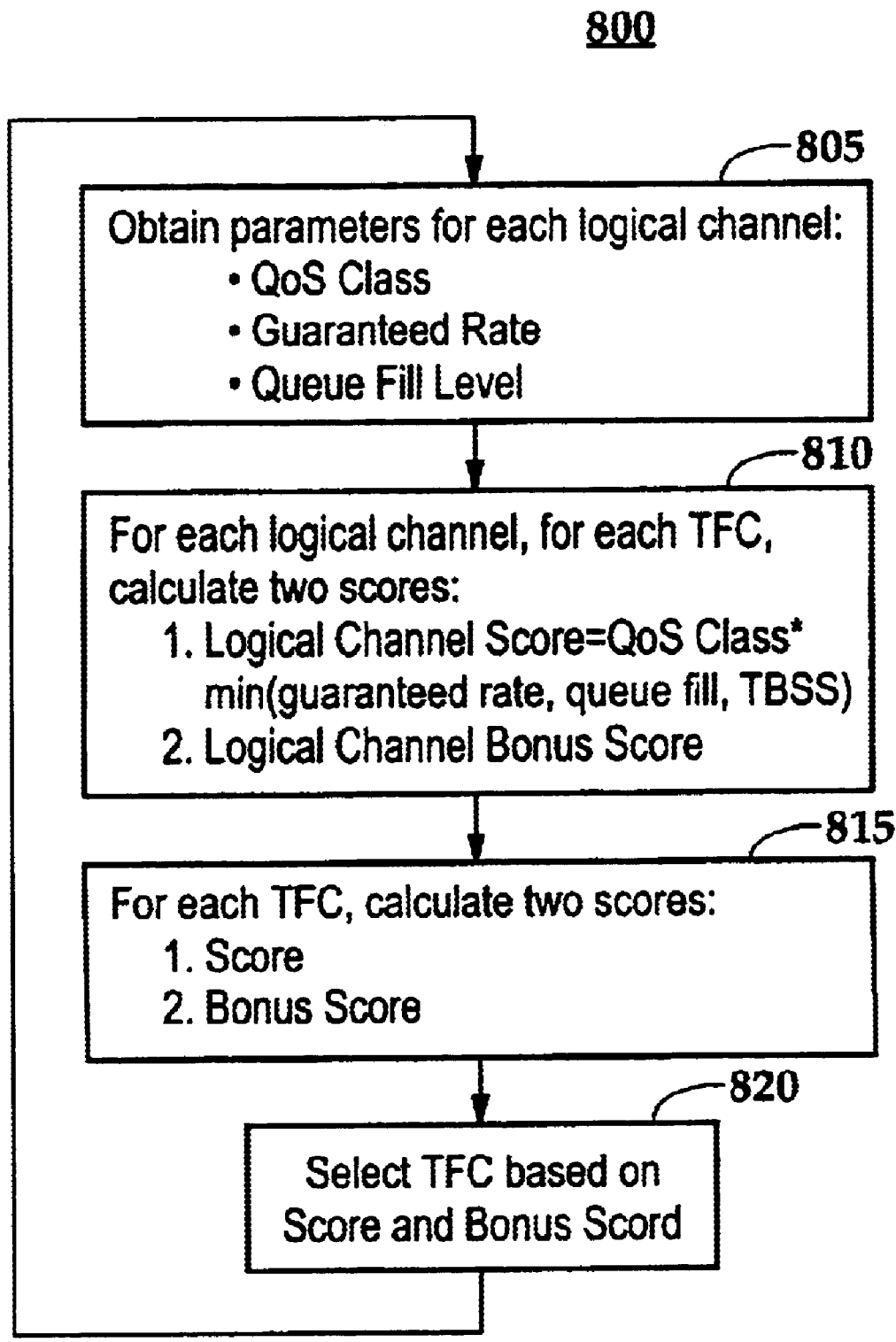
FIG. 8 illustrates another exemplary method in flowchart form for scheduling data flows in accordance with the present invention.

Referring now to FIG. 8, another exemplary method in flowchart form for scheduling data flows in accordance with the present invention is illustrated generally at 800. For the exemplary flowchart 800, the scheduling process in the MAC layer includes the selection of a TFC from a TFCS using a two-step scoring process. This selection may be performed once for each TTI. Initially, several parameters are obtained for each logical channel. (Step 805.) The QoS Class for each logical channel may be obtained from the corresponding RAB parameter. The QoS Class value may be obtained directly from the RAB parameter called "QoS Class", or it may alternatively be calculated from one or more RAB parameters using any suitable formula. The Guaranteed Rate for each logical channel may also be obtained from the corresponding RAB parameter.

The Guaranteed Rate value, may be obtained directly from the "Guaranteed Rate" RAB parameter, calculated from preassigned fair queuing weights using the GPS formula (as presented in "A Generalised Processor Sharing Approach to Flow Control in Integrated Services Networks: The Single Node Case", A. K. Parekh, R. G. Gallager, published in IEEE/ACM Transactions On Networking, Vol. 1, No. 3, Jun. 1993, Pp. 344–357), or it may alternatively be calculated from one or more RAB parameters using any suitable formula. If the "Guaranteed Rate" RAB parameter is not applicable or is otherwise unsatisfactory, a zero (0) value may optionally be assigned to this parameter. (In the following description, it is assumed that the Guaranteed Rate is expressed as bits per 10 ms.) The Queue Fill Level corresponds to a number of PDUs queued for each logical channel, and it may be obtained from the RLC entity.

For each logical channel for each TFC in the TFCS, two scores are calculated by the following formulas (Step 810.):

Score_lch=QoS Class*min(TBSS, Guaranteed Rate, Queue Fill Level);  (1) and

If min(Queue Fill Level, TBSS)>Guaranteed Rate, then Bonus_score_lch=QoS Class*[min(Queue Fill Level, TBSS)−Guaranteed Rate], Otherwise, Bonus_score_lch=0.  (2)

For each TFC in the TFCS, two other scores are calculated using the following formulas (Step 815.):

Score=Sum(Score_lch); (1) and

Bonus_score=Sum(Bonus_score_lch). (2)

The TFC that has the greatest,Score is selected to determine the bandwidth distribution. If two or more TFCs have equal Scores, the TFC with the highest Bonus_score is selected therefrom. (Step 820.) This exemplary procedure from. flowchart 800 ensures that if there is a TFC that transmits at least the guaranteed rate for each flow, then that TFC is chosen. This exemplary procedure also attempts to maximize the amount of data being transmitted from the highest QoS class(es). (It should be noted that it is assumed that the TFCs are ordered within the TFCS such that the TBSS for each logical channel increases with increasing TFCI.)

The following pseudo-code is an outline of an exemplary algorithm for implementing the scheme described hereinabove with reference to FIGS. 7 and 8:

```
Int sched_abs_prio(const REALVECTOR_t& 
GuarRatevect, const VECTOR_t& tfcs,
const REALVECTOR_t& QoSin, const INTVECTOR_t& 
Pusizein) {
    int maxTrch=tfcs.Length( ),
    int tfc, tfci, qf, gr, rate, trch, trchGl;
    int tfcToUse,
    //maximum bitrate that can be sent in one frame
    int maxrate, bits_to_send;
    //how many TFCs, supposing that first LCH is always used
    int maxTFC=((VECTOR_t&) tfcs [0]) Length( );
    double score=0, bonus_score=0;
    double max_score=0;
    double max_bonus_score=0;
    for (tfc=0; tfc<maxTFC; tfc++) {
    score=bonus_score=0;
    //loop through all TrChs of this MS for this TFC
    for (trch=0; trch<maxTrCh; trch++) {
    //count the score for this TFC
        int tbs=((INTVECTOR_t&)<(VECTOR_t&)tfcs
            [lch])[tfc])>[0];
        int tbss=((INTVECTOR_t&:)<(VECTOR_t&)tfcs
            [lch])[tfc])>[1];
        rate+=tbss;
        qf=PTisizein[lch]*queueFillStateMemory[lchG1];
        gr=GuarRateVect[lch]/100;
        bits_to_send=min(tbss, qf);
        /* Give score according to real bits that can be sent, but not
        * for more than guaranteed rate
        */
        score+=QoSin[lch]*min(gr, bits_to_send);
        /* If the real bits that can be sent is larger than guaranteed
        * rate, give bonus score for bits sent over guaranteed rate
        */
        if (bits_to_send>=gr) {
            bonus_score+=QoSin[lch]*(bits_to_send - gr);
        }
    }
    if(score>max_score) {
        tfcToUse=tfc;
        max_score=score;
        max_bonus_score=bonus_score;
    } else if (score==max_score && bonus_score>max_bonus_score) {
        tfcToUse=tfc;
        max_bonus_score=bonus=score,
    }
    }
    return (tfcToUse);
}
```

The various principles and embodiment(s) of the present invention therefore describe and enable the provisioning of bandwidth allocation to entities in a communications system. With respect to embodiment(s) described hereinabove with reference to FIGS. 5 and 6, they provide fair queuing for a mixed. service scenario in which it is desirable (or necessary) to multiplex several services to a single transport channel. This is typically necessary in a MAC-c entity, but it may also be beneficial in a MAC-d entity (e.g., in order to save transport channels). With respect to embodiment(s) described hereinabove with reference to FIGS. 7 and 8, they provide another alternative that can be especially advantageous if there is only limited memory available (because the backlog memory is not necessary), when fairness is not required. Even though these embodiment(s) are not fair, they still provide the guaranteed rate transfer rate to all service classes. Specifically, these embodiment(s) are optimized to provide best quality of service to flows having the highest QoS class(es), while still providing a minimum level of service to all flows. Furthermore, because no backlog memory need be updated each TTI, they can be faster to execute, even though they cannot guarantee fairness over the long run.

Although preferred embodiment(s) of the methods, systems, and arrangements of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for allocating channel resources in a communications system, comprising the steps of:
   calculating a guaranteed rate transfer rate for a plurality of flows;
   calculating a weighted fair queuing (WFQ) transfer rate for said plurality of flows;
   scoring three scores in three predetermined categories for each transport format combination in a transport format combination set;
   selecting a transport format combination index based on said three scores; and
   multiplexing a transport block set size associated with the selected transport format combination index using a three stage process.

2. A method according to claim 1, wherein said step of calculating a guaranteed rate transfer rate for a plurality of flows comprises the step of summing a guaranteed rate of a transport channel and a guaranteed rate backlog, said guaranteed rate backlog capable of being zero.

3. A method according to claim 1, wherein said step of calculating a weighted fair queuing (WFQ) transfer rate for said plurality of flows comprises the step of calculating said weighted fair queuing (WFQ) transfer rate responsive to a maximum rate of all transport channels, a maximum quality of service class, a sum of quality of service classes for all active flows of said plurality of flows, and a fair queuing rate backlog, said fair queuing rate backlog capable of being zero.

4. A method according to claim 1, wherein said step of scoring three scores in three predetermined categories for each transport format combination comprises the steps of:

determining a guaranteed rate score based on a sum of quality of service classes and a minimum between a transport block set size and said guaranteed rate transfer rate;

determining a weighted fair queuing (WFQ) score based on said sum of quality of service classes and a minimum between said transport block set size and said weighted fair queuing (WFQ) transfer rate; and determining a bonus score responsive to, at least in part, said sum of quality of service classes, a total number of bits that may be transmitted from any transport channel, said transport block set size, said guaranteed rate transfer rate, and said weighted fair queuing (WFQ) transfer rate.

5. A method according to claim 4, wherein said step of selecting a transport format combination index based on said three scores comprises the steps of:

selecting a particular transport format combination index that corresponds to a maximum of said guaranteed rate score;

if no single maximum of said guaranteed rate score exists, selecting a particular transport format combination index that corresponds to said maximum of said guaranteed rate score and to a maximum of said weighted fair queuing (WFQF) score; and if no single maximum of both said guaranteed rate score and said weighted fair queuing (WFQ) score exists, selecting a particular transport format combination index that corresponds to said maximum of said guaranteed rate score and to a maximum of said weighted fair queuing (WFQ) score and to a maximum of said bonus score.

6. A method according to claim 1, wherein said step of multiplexing a transport block set size associated with the selected transport format combination index using a three stage process comprises the step of:

if said transport block set size is less than said guaranteed rate transfer rate, giving each flow its respective guaranteed rate in quality of service order until said transport block set size is exhausted;

if, on the other hand, said transport block set size is greater than said guaranteed rate transfer rate, giving all flows their respective guaranteed rates and if said transport block set size is less than said weighted fair queuing (WFQ) transfer rate, giving each flow its respective fair share until said transport block set size is exhausted; and if, on the other hand, said transport block set size is greater than said weighted fair queuing (WFQ) transfer rate, giving all flows their respective fair shares, with at least one flow having a highest priority receiving excess bandwidth.

7. A method according to claim 1, further comprising the step of:

updating a guaranteed rate backlog and a fair queuing rate backlog for each flow that has pending data to send and did not receive either its respective guaranteed rate or it respective fair share.

8. A scheduling method for providing bandwidth to entities in a communications system, comprising the steps of:

ascertaining an associated quality of service (QoS) for each flow of a plurality of flows;

updating a guaranteed rate backlog memory and a weighted fair queuing (WFQ) backlog memory for each flow of said plurality of flows;

calculating a guaranteed rate transfer rate for said plurality of flows;

calculating a weighted fair queuing (WFQ) transfer rate for said plurality of flows;

assigning bandwidth to each flow of said plurality of flows responsive to (i) said guaranteed rate transfer rate; (ii) said weighted fair queuing (WFQ) transfer rate; and (iii) said guaranteed rate backlog memory, said weighted fair queuing (WFQ) backlog memory, and said associated quality of service (QoS) for said each flow of said plurality of flows; and scoring each bandwidth distribution option of a plurality of bandwidth distribution options responsive to (i) said associated quality of service (QoS) for said each flow of said plurality of flows and said guaranteed rate transfer rate and (ii) said associated quality of service (QoS) for said each flow of said plurality of flows and said weighted fair queuing (WFQ) transfer rate.

9. A method according to claim 8, further comprising the step of:

selecting a bandwidth distribution option from said plurality of bandwidth distribution options by placing a higher priority on scores determined responsive to said guaranteed rate transfer rate.

10. A method according to claim 8, wherein said step of assigning bandwidth to each flow of said plurality of flows comprises the step of:

allocating bandwidth from a selected bandwidth distribution option by giving said each flow of said plurality of flows its respective guaranteed rate transfer rate in an order determined by the respective associated quality of services (QoSs) of said each flow and by giving said each flow its respective weighted fair queuing (WFQ) transfer rate in an order determined by the respective associated quality of services (QoSs) of said each flow.

11. A method according to claim 10, wherein said step of assigning bandwidth to each flow of said plurality of flows further comprises the step of:

sending any remaining packets from said each flow of said plurality of flows in an order determined by the respective associated quality of services (QoSs) of said each flow.

12. A method according to claim 8, wherein said step of updating a guaranteed rate backlog memory and a weighted fair queuing (WFQ) backlog memory for each flow of said plurality of flows comprises the step of:

increasing said guaranteed rate backlog memory and said weighted fair queuing (WFQ) backlog memory for said each flow of said plurality of flows that was not permitted to transfer a number of packet or packets that equals each respective flows guaranteed rate transfer rate and weighted fair queuing (WFQ) transfer rate, respectively, during a previous transmission time interval (TTI).

13. A method for allocating channel resources in a communications system, comprising the steps of:

ascertaining a quality of service class for each logical channel of a plurality of logical channels;

ascertaining a guaranteed rate for said each logical channel;

ascertaining a queue fill level for said each logical channel;

calculating a first and a second score for each of a plurality of transport format combinations of a transport format combination set;

selecting a transport format combination of said plurality of transport format combinations that has a highest first score.

14. The method of claim 13, further comprising the step of:

if multiple transport format combinations of said plurality of transport format combinations have an equally high first score, selecting a transport format combination from said multiple transport format combinations that has a highest second score.

15. The method of claim 13, wherein said step of ascertaining a quality of service class for each logical channel of a plurality of logical channels comprises the step of analyzing one or more radio bearer parameters.

16. The method of claim 13, wherein said step of ascertaining a guaranteed rate for said each logical channel comprises the step of analyzing one or more radio bearer parameters.

17. The method of claim 13, wherein said step of ascertaining a queue fill level for said each logical channel comprises the step of obtaining a number of protocol data units for each logical channel from a radio link control entity.

18. The method of claim 13, wherein said step of calculating said first score comprises the steps of:

determining a logical channel score responsive to a quality of service class and a minimum of a transport block set size, a guaranteed rate, and a queue fill level;

repeating said step of determining a logical channel score for each of a plurality of logical channels of a transport format combination; and determining said first score by summing a plurality of logical channel scores that correspond to said plurality of logical channels.

19. The method of claim 13, wherein said step of calculating said second score comprises the steps of:

determining a bonus score responsive to a quality of service class, a guaranteed rate, and a minimum of a transport block set size and a queue fill level if said minimum is greater than said guaranteed rate, and determining said bonus score to be zero if said minimum is not greater than said guaranteed rate;

repeating said step of determining a bonus score for each of a plurality of logical channels of a transport format combination; and determining said second score by summing a plurality of bonus scores that correspond to said plurality of logical channels.

20. A method for providing bandwidth to entities in a communications system, comprising the step of:

determining a quality of service (QoS) class that is associated with each channel of a plurality of channels;

determining a guaranteed rate transmission rate for said each channel;

determining a queue fill level of a queue that corresponds to said each channel;

calculating a first score for said each channel responsive to said quality of service (QoS) class, said guaranteed rate transmission rate, and said queue fill level;

selecting at least one bandwidth distribution option from said plurality of bandwidth distribution options by determining a highest third score and said at least one bandwidth distribution option corresponding thereto; and if said at least one bandwidth distribution option corresponds to more than one bandwidth distribution option, selecting a bandwidth distribution option from said at least one bandwidth distribution option that corresponds to a highest fourth score.

21. A method according to claim 20, further comprising the step of:

calculating a second score for said each channel responsive to said guaranteed rate transmission rate and said queue fill level.

22. A method according to claim 21, further comprising the steps of:

A repeating said steps of calculating a first score and calculating a second score for each bandwidth distribution option of a plurality of bandwidth distribution options;

calculating a third score and a fourth score responsive to said first score and said second score, respectively, and based on said step of repeating.

23. A method according to claim 22, wherein said step of calculating a third score and a fourth score further comprising the steps of:

calculating said third score by summing a number of first scores and calculating said fourth score by summing said number of second scores, said number corresponding to the number of bandwidth distribution options of said plurality of bandwidth distribution options.

24. A receiver entity for providing bandwidth to a plurality of transmitter entities in a communications system, comprising:

a plurality of buffers, each buffer of said plurality of buffers being associated with a quality of service (QoS) level and a guaranteed rate transfer rate, said each buffer including one or more packets defining a queue fill level;

a scheduler, said scheduler in operative communication with said plurality of buffers to receive said quality of service (QoS), said guaranteed rate transfer rate, and said queue fill level, said each buffer transmitting at least one packet of said one or more packets in accordance with at least one instruction from said scheduler, said scheduler configured to:

calculate a channel score responsive to said quality of service (QoS), said guaranteed rate transfer rate, and said queue fill level for said each buffer;

calculate a channel bonus score responsive to said guaranteed rate transfer rate and said queue fill level for said each buffer; and assign bandwidth via said at least one instruction to said each buffer of said plurality of buffers responsive to said channel score for said each buffer and said channel bonus score for said each buffer.

25. A receiver entity according to claim 24, wherein said scheduler is further configured to assign bandwidth responsive to a plurality of transport block set sizes (TBSSs) from a predetermined bandwidth distribution option set.

26. A receiver entity according to claim 24, wherein the receiver entity comprises a portion of at least one of a radio network controller node and a user equipment.

27. A scheduling method for providing bandwidth to entities in a communications system, comprising the steps of:

calculating a plurality of first scores, each first score of said plurality of first scores corresponding to a bandwidth distribution option of a plurality of bandwidth distribution options, said plurality of first scores calculated responsive to Quality of Service (QoS) levels;

calculating a plurality of second scores, each second score of said plurality of second scores corresponding to a bandwidth distribution option of said plurality of bandwidth distribution options;

determining whether there is a highest first score from among said plurality of first scores;

if so, selecting the bandwidth distribution option corresponding to said highest first score;

if not,
identifying a group of second scores from said plurality of second scores that correspond to a group of first scores that are higher than all other first scores of said plurality of first scores; and
selecting the bandwidth distribution option corresponding to a highest second score from said group of second scores.

28. A method according to claim 27, further comprising the step of:
distributing bandwidth to said entities in accordance with the selected bandwidth distribution option.

29. A method according to claim 27, wherein each of said bandwidth distribution options comprise a transport format combination and said plurality of bandwidth distribution options comprises a transport format combination set.

30. A method for allocating channel resources in a communications system, comprising the steps of:
ascertaining a quality of service class for each logical channel of a plurality of logical channels;
ascertaining a guaranteed rate for said each logical channel of said plurality of logical channels, wherein said step of ascertaining a guaranteed rate for said each logical channel of said plurality of logical channels comprises the step of ascertaining said guaranteed rate for said each logical channel of said plurality of logical channels in accordance with the following equation:

$$rate\_i = weight\_i/(sum\_of\_all\_active\_weights) * maximum\_rate,$$

where said rate_i comprises a respective said guaranteed rate for said each logical channel of said plurality of logical channels, said weight_i comprises a respective fair queuing rate for said each logical channel of said plurality of logical channels, said sum_of_all_active_weights comprises a sum of said respective fair queuing rates for said each logical channel for all active logical channels of said plurality of logical channels, and said maximum_rate comprises a maximum possible transmission rate; and assigning bandwidth to said each logical channel of said plurality of logical channels responsive to said quality of service class and said guaranteed rate for respective ones of said each logical channel of said plurality of logical channels.

31. A method according to claim 30, further comprising the step of:
ascertaining a queue fill level for said each logical channel of said plurality of logical channels; and
wherein said step of assigning bandwidth to said each logical channel of said plurality of logical channels responsive to said quality of service class and said guaranteed rate for respective ones of said each logical channel of said plurality of logical channels comprises the step of assigning bandwidth to said each logical channel of said plurality of logical channels responsive to said queue fill level for respective ones of said each logical channel of said plurality of logical channels.

32. A method according to claim 30, wherein said step of ascertaining a queue fill level for said each logical channel of said plurality of logical channels comprises the step of obtaining a number of protocol data units for said each logical channel of said plurality of logical channels from a predetermined entity.

33. A method according to claim 30, wherein said each logical channel of said plurality of logical channels comprises an information flow.

34. A method according to claim 30, wherein said step of ascertaining a quality of service class for each logical channel of a plurality of logical channels comprises the step of analyzing at least one radio bearer parameter.

35. A method according to claim 30, wherein said step of ascertaining a guaranteed rate for said each logical channel of said plurality of logical channels comprises the step of analyzing at least one radio beaker parameter.

36. A method according to claim 30, wherein said step of ascertaining a guaranteed rate for said each logical channel of said plurality of logical channels comprises the step of ascertaining said guaranteed rate for said each logical channel of said plurality of logical channels responsive to a respective ratio of fair queuing rates.

37. A method according to claim 35, wherein said respective ratio of fair queuing rates comprises a ratio of a respective fair queuing rate for a respective logical channel of said plurality of logical channels to a total fair queuing rate of said plurality of logical channels.

38. A method according to claim 30, wherein said step of ascertaining a guaranteed rate for said each logical channel of said plurality of logical channels comprises the step of ascertaining said guaranteed rate for said each logical channel of said plurality of logical channels responsive to a maximum possible transmission rate.

39. A method for allocating channel resources in a communications system, comprising the steps of:
ascertaining a quality of service class for each logical channel of a plurality of logical channels;
ascertaining a guaranteed rate for said each logical channel of said plurality of logical channels based, at least in part, on an equation, said equation including a product of a maximum rate and a ratio, said ratio being a quotient of a weight of a respective one of said each logical channel of said plurality of logical channels and a total weight of said plurality of logical channels; and
assigning bandwidth to respective ones of said each logical channel of said plurality of logical channels responsive to said quality of service class and said guaranteed rate for said respective ones of said each logical channel of said plurality of logical channels.

* * * * *